Figure 1:
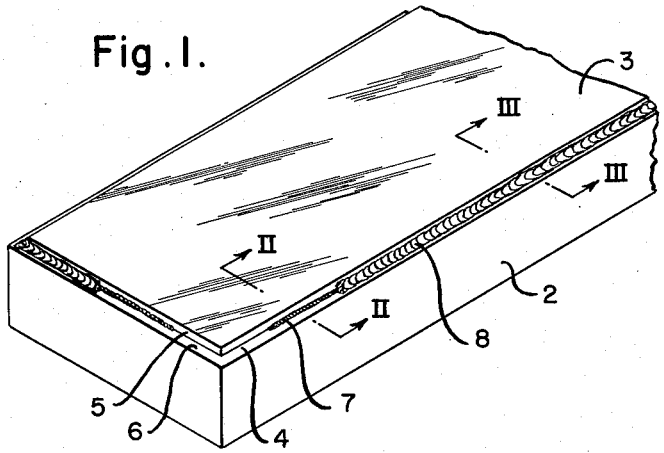

Sept. 19, 1961  J. H. JONES  3,001,059

MANUFACTURE OF BIMETALLIC BILLETS

Filed Aug. 20, 1956

INVENTOR
Joseph H. Jones his attorneys

United States Patent Office 3,001,059
Patented Sept. 19, 1961

3,001,059
MANUFACTURE OF BIMETALLIC BILLETS
Joseph H. Jones, Canton, Ohio, assignor to Copperweld Steel Company, a corporation of Pennsylvania
Filed Aug. 20, 1956, Ser. No. 605,071
8 Claims. (Cl. 219—137)

This invention relates to the manufacture of bimetallic billets and has to do particularly with an improved duplex method of welding together the components of a bimetallic billet whereby superior results are obtained at low cost.

The invention has special advantages in the manufacture of a bimetallic billet having a component of stainless steel, and for purposes of explanation and illustration the invention will be described as practiced in the manufacture of a bimetallic billet having a component of carbon steel and a component of stainless steel, although it is to be understood that in its broadest aspects the invention is not so limited.

A common type of bimetallic billet utilized for the production of bimetallic or so-called "clad" strip comprises a relatively thick backing component of carbon steel and either one facing component or two facing components of stainless steel applied to one or both of the principal faces of the backing component, the facing components being relatively thin. For present purposes such a bimetallic billet having but one facing component will be considered. The backing and facing components must be tightly sealed to each other peripherally to prevent ingress of air therebetween and they must also be so strongly connected to each other that the connection will not be broken either due to unequal expansion of the components while the billet is being heated for hot rolling or in the hot rolling mill until the components have become bonded to each other by heat and pressure. It is customary to weld the components together peripherally but prior to the present invention either the weld has not had sufficient strength, if an attempt was made to produce the weld economically, or the cost of welding has been undesirably high.

I have devised a duplex system of welding together the components of a bimetallic billet whereby an effective and strong weld is produced at relatively low cost.

In manufacturing a bimetallic billet having a facing component of stainless steel it is of critical importance that neither air nor foreign matter be allowed ingress between the billet components because such ingress adversely affects the quality of the clad strip produced from the billet. While submerged arc welding is a highly desirable type of welding to employ since by that method a strong weld can be economically formed, submerged arc welding has the disadvantage that the flux employed in welding, being a finely divided material, usually granular, may seep between the billet components and adversely affect the quality of the clad strip produced.

I obviate the possibility of the granular flux employed in submerged arc welding seeping between the billet components by initially sealing the billet components together by fluxless welding, preferably by shielded inert gas metal arc welding. Shielded inert gas metal arc welding is especially well adapted for sealing the billet components together since by that method a relatively small weld of excellent sealing characteristics can be economically formed. Shielded inert gas metal arc welding could be utilized for forming the weld relied upon to hold the billet components together during heating and hot rolling but would be decidedly uneconomical since a considerable number of passes would be required to build up a weld of the desired strength.

I manufacture a bimetallic billet by assembling billet components in face to face relation, peripherally sealing the joint between the components by fluxless welding and thereafter applying flux and firmly joining the billet components by peripherally welding them together by submerged arc welding. My invention has especial advantages, as pointed out above, in the manufacture of a bimetallic billet out of components respectively of carbon steel and stainless steel.

In a preferred method of practicing the invention I manufacture a bimetallic billet by assembling a carbon steel billet component and a stainless steel billet component of smaller transverse dimension than the carbon steel billet component in face to face relation providing a recess extending along at least a portion of the periphery of the assembly having faces of the respective components disposed generally at right angles to each other, at least partially in the recess peripherally sealing the joint between the components by fluxless welding and thereafter applying flux in the recess and firmly joining the billet components by peripherally welding them together at least partially in the recess by submerged arc welding. As above mentioned, the fluxless welding is preferably shielded inert gas metal arc welding.

The fluxless welding is preferably accomplished using an austenitic steel welding rod, and such a welding rod is also preferably used in the submerged arc welding. The faces of the billet components which are to be disposed in contact with each other when the billet is being formed are preferably nickel plated as the nickel plating results in a quicker bond and contributes to insuring a sound weld, although the components are so effectively sealed and so strongly joined together by my duplex process of welding that the nickel plating may be dispensed with.

Other details, objects and advantages of the invention will become apparent as the following description of a present preferred method of practicing the same proceeds.

Figure 2:
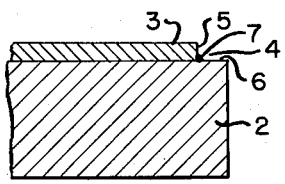
Figure 3:
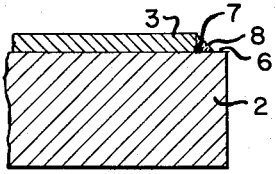

In the accompanying drawings I have illustrated a present preferred method of practicing the invention in which:

FIGURE 1 is a fragmentary diagrammatic isometric view to enlarged scale taken on the line II—II of FIGURE 1; and FIGURE 2 is a fragmentary transverse cross-sectional view to enlarged scale taken on the line II—II of FIGURE 1; and FIGURE 3 is a view similar to FIGURE 2 taken on the line III—III of FIGURE 1.

Referring now more particularly to the drawings, there are shown a carbon steel backing component 2 and a stainless steel facing component 3 assembled in face to face relation to form a bimetallic billet. The stainless steel billet component 3 may, for example, be of type 300 stainless steel although other types of stainless steel may also be employed. The facing component 3 is of smaller transverse dimension both laterally and longitudinally than the backing component 2 as clearly shown in the drawings so that when the components are assembled a recess 4 is provided which extends peripherally of the assembly and has faces 5 and 6 of the respective components disposed generally at right angles to each other. The opposed faces of the components may be and preferably are nickel plated for rapid bonding and to insure a sound weld, and it may be deemed desirable to nickel plate the entire outer surfaces of the billet components as the nickle on the outer faces of the billet tends to act in the nature of a lubricant in hot rolling.

With the billet components assembled in the relationship above described they are sealed together peripherally by fluxless welding which produces a relatively fine but highly effective sealing weld 7. The weld 7 seals the components together and prevents ingress therebetween of air or foreign matter but does not have sufficient strength to firmly join the billet components together to hold them against separation during heating and hot rolling.

The fluxless welding is preferably shielded inert gas metal arc welding, and the weld 7 may be performed by the process commercially known as "Sigma" welding. That process involves arc welding while protecting the arc from the atmosphere by a blanket of inert gas such as argon, helium or a mixture of the two. A coil of wire is used for filler metal, the wire being fed through a flexible tube to a water cooled "gun" or head and into the recess 4 at the juncture of the surfaces 5 and 6. The wire or welding electrode is preferably of austenitic stainless steel, for example, type 309, type 310 or type 316. All of those types are highly alloyed austenitic stainless steels. They are found to produce a weld of high strength, good ductility and effective resistance to oxidation during heating and while at rolling temperature. However, the weld 7 does not have sufficient body to hold the billet components together against the stresses tending to separate them in heating and hot rolling. To form a sufficiently strong weld by the fluxless method would require making a considerable number of passes to build up the weld which would be uneconomical both from the standpoint of use of the welding equipment and from the standpoint of loss of time.

After the weld 7 has been formed I apply flux in the recess 4 and peripherally weld the components together by submerged arc welding. The weld thus produced is designated 8. Submerged arc welding is a well known method of welding. One type of submerged arc welding which may be employed is commercially known as "Unionmelt" in which the arc is shielded by granular flux; the flux upon contact with the arc liquifies and forms a blanket on top of the molten metal protecting it from the atmosphere. Preferably the granular flux is flowed into the recess about the continuously fed electrode which builds up the weld, the electrode plowing through the flux, forming an arc, melting and welding, all continuously and concurrently. The flux pours down ahead of the weld zone and could seep between the billet components but for the sealing weld 7. By this method a relatively strong heavy weld can be formed in a single pass. The weld is preferably formed using a welding electrode of type 309, type 310 or type 316 stainless steel. The weld 8 is superimposed upon and integrated with the weld 7 and is united with substantial areas of the surfaces 5 and 6 as shown in FIGURE 3.

Thus the fluxless weld 7 effectively seals the billet components together to prevent the ingress of flux between the components and the components are firmly joined by the weld 8 which is formed by submerged arc welding utilizing flux which would seep between the billet components with disastrous results if the weld 7 were not employed. But two passes are required, one to form the weld 7 and one to form the weld 8. The sealing weld 7 is formed with relatively small electrode or filler wire, perhaps 3/32" in diameter, which forms, for example a 3/8" bead, while a heavier electrode or filler wire, perhaps 5/32" in diameter, through which current of relatively high amperage can be passed, is used for forming the weld 8, producing a relatively massive weld deposit in a single pass. The process is economical and produces a bimetallic billet of exceptional quality. Such billets have been employed for the production of many coils of clad strip and the strip has been of unprecedentedly uniform high quality considering the economy of the process employed in forming the bimetallic billet.

While I have described and illustrated a present preferred method of practicing the invention it is to be distinctly understood that the invention is not limited thereto but may be otherwise variously practiced within the scope of the following claims.

I claim:

1. A method of making a bimetallic billet comprising, all while the billet components except at and adjacent the welding zone are at room temperature, assembling billet components in face to face relation, peripherally sealing the joint between the components by fluxless welding and thereafter applying flux and firmly joining the billet components by peripherally welding them together by submerged arc welding.

2. A method of making a bimetallic billet comprising, all while the billet components except at and adjacent the welding zone are at room temperature, assembling billet components respectively of carbon steel and stainless steel in face to face relation, peripherally sealing the joint between the components by fluxless welding and thereafter applying flux and firmly joining the billet components by peripherally welding them together by submerged arc welding.

3. A method of making a bimetallic billet comprising, all while the billet components except at and adjacent the welding zone are at room temperature, assembling a carbon steel billet component and a stainless steel billet component of smaller transverse dimension than the carbon steel billet component in face to face relation providing a recess extending along at least a portion of the periphery of the assembly having faces of the respective components disposed generally at right angles to each other, at least partially in the recess peripherally sealing the joint between the components by fluxless welding and thereafter applying flux in the recess and firmly joining the billet components by peripherally welding them together at least partially in the recess by submerged arc welding.

4. A method of making a bimetallic billet comprising, all while the billet components except at and adjacent the welding zone are at room temperature, assembling billet components in face to face relation, peripherally sealing the joint between the components by shielded inert gas metal arc welding and thereafter applying flux and firmly joining the billet components by peripherally welding them together by submerged arc welding.

5. A method of making a bimetallic billet comprising, all while the billet components except at and adjacent the welding zone are at room temperature, assembling a carbon steel billet component and a stainless steel billet component of smaller transverse dimension than the carbon steel billet component in face to face relation providing a recess extending along at least a portion of the periphery of the assembly having faces of the respective components disposed generally at right angles to each other, at least partially in the recess peripherally sealing the joint between the components by shielded inert gas metal arc welding and thereafter applying flux in the recess and firmly joining the billet components by peripherally welding them together at least partially in the recess by submerged arc welding.

6. A method of making a bimetallic billet comprising, all while the billet components except at and adjacent the welding zone are at room temperature, assembling in face to face relation billet components respectively of carbon steel and stainless steel, peripherally sealing the joint between the components by fluxless welding using an austenitic stainless steel welding rod and thereafter applying flux and firmly joining the billet components by peripherally welding them together by submerged arc welding.

7. A method of making a bimetallic billet comprising, all while the billet components except at and adjacent the welding zone are are at room temperature, nickel plating a face of a billet component of carbon steel and a face of a billet component of stainless steel, assembling the components with the nickel plated faces in contact, peripherally sealing the joint between the components by fluxless welding and thereafter applying flux and firmly joining the billet components by peripherally welding them together by submerged arc welding.

8. A method of making a bimetallic billet comprising, all while the billet components except at and adjacent the welding zone are at room temperature, nickel plating a face of a billet component of carbon steel and a face of a billet component of stainless steel of smaller transverse dimension than the billet component of carbon steel, assembling the components with the nickel plated faces in contact, thereby providing a recess extending along at least a portion of the periphery of the assembly having faces of the respective components disposed generally at right angles to each other, at least partially in the recess peripherally sealing the joint between the components by shielded inert gas metal arc welding using an austenitic stainless steel welding rod and thereafter applying flux in the recess and firmly joining the billet components by peripherally welding them together at least partially in the recess by submerged arc welding.

References Cited in the file of this patent

UNITED STATES PATENTS

| | | |
|---|---|---|
| 2,227,193 | Maxwell | Dec. 31, 1940 |
| 2,498,275 | Johnson | Feb. 21, 1950 |
| 2,537,207 | Carlson et al. | Jan. 9, 1951 |
| 2,550,641 | Harter | Apr. 24, 1951 |
| 2,567,012 | Donelan | Sept. 4, 1951 |
| 2,718,690 | Ulam | Sept. 27, 1955 |
| 2,744,314 | Kinney | May 8, 1956 |
| 2,813,333 | Pompa | Nov. 19, 1957 |

OTHER REFERENCES

Welding Handbook, 1942 Edition, page 824. Published by American Welding Society, New York, New York. Copy in Division 14.

UNITED STATES PATENT OFFICE
CERTIFICATE OF CORRECTION

Patent No. 3,001,059

September 19, 1961

Joseph H. Jones

It is hereby certified that error appears in the above numbered patent requiring correction and that the said Letters Patent should read as corrected below.

Column 1, line 13, for "special" read -- especial --; column 2, lines 42 and 43, for "to enlarged scale taken on the line II—II of FIGURE 1; and" read -- illustrating the manufacture of a bimetallic billet; --; line 66, for "nickle" read -- nickel --; column 4, line 66, strike out "are", first occurrence.

Signed and sealed this 30th day of January 1962.

(SEAL)
Attest:

ERNEST W. SWIDER
Attesting Officer

DAVID L. LADD
Commissioner of Patents